UNITED STATES PATENT OFFICE.

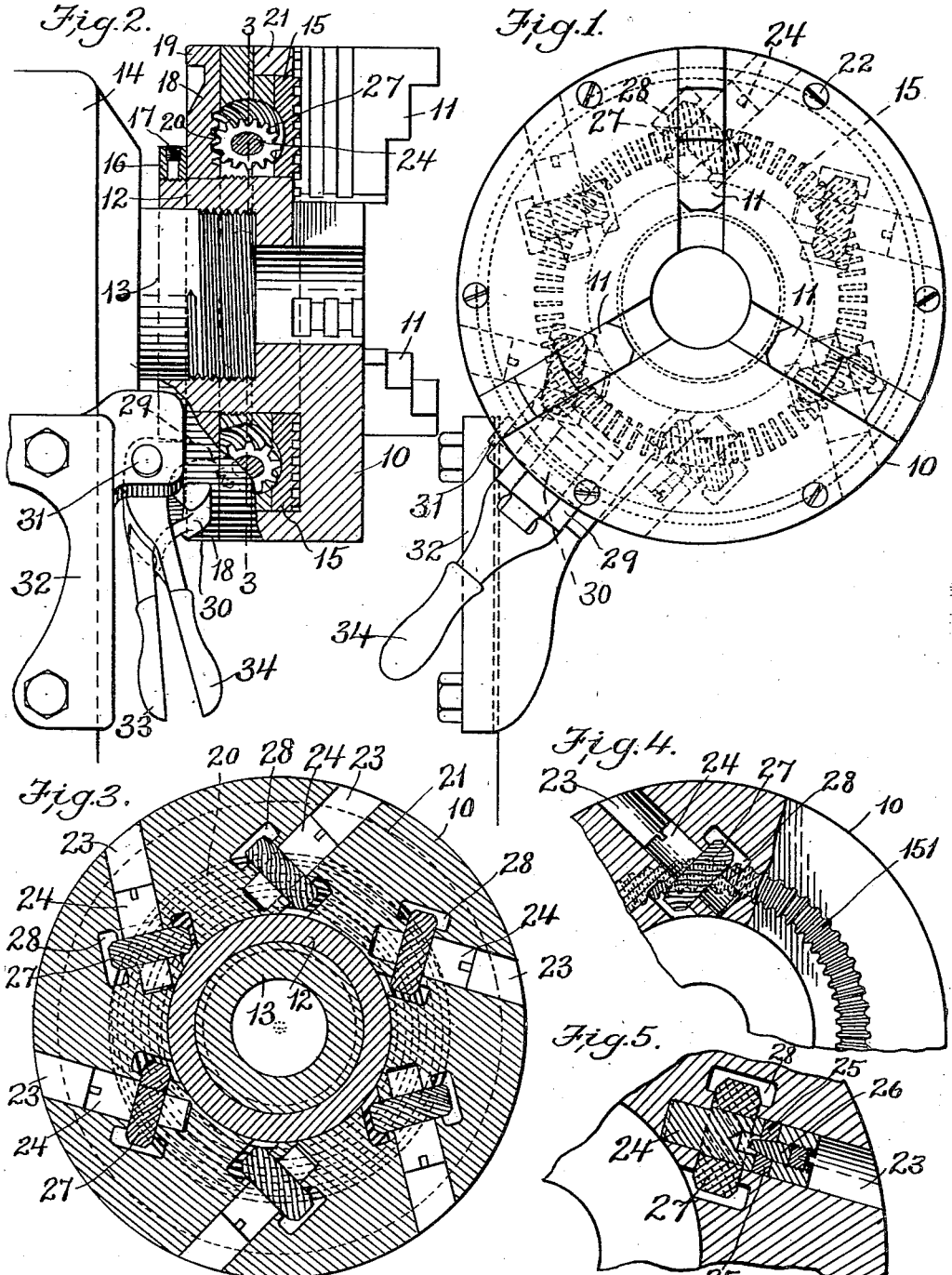

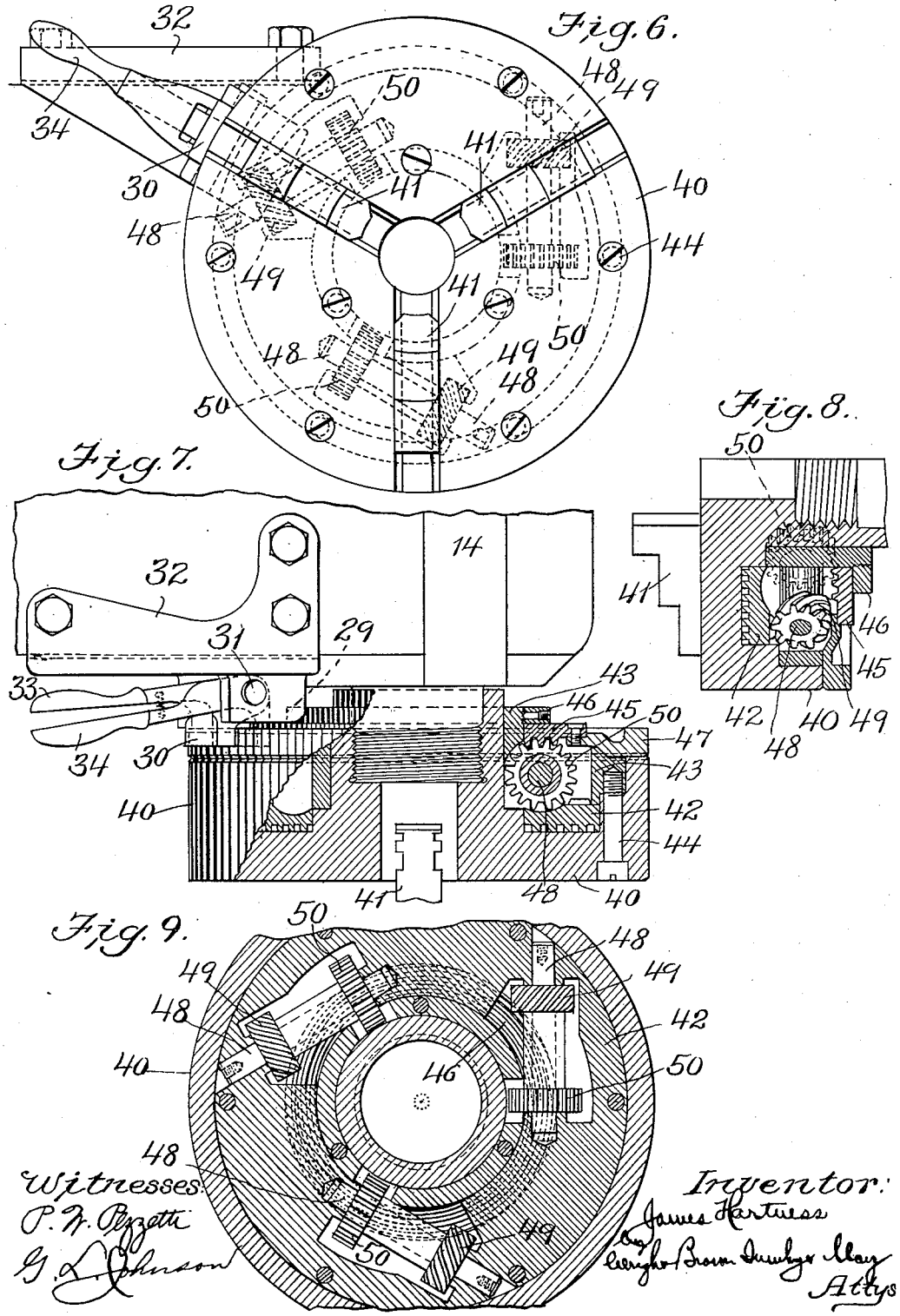

JAMES HARTNESS, OF SPRINGFIELD, VERMONT.

CHUCK.

1,077,470. Specification of Letters Patent. Patented Nov. 4, 1913.

Application filed September 28, 1912. Serial No. 722,962.

*To all whom it may concern:*

Be it known that I, JAMES HARTNESS, a citizen of the United States, and a resident of Springfield, in the county of Windsor and State of Vermont, have invented certain new and useful Improvements in Chucks, of which the following is a specification.

This invention has relation to rotary chucks for holding work upon which a grinding, turning or other operation is to be performed, and more especially to that type of chucks in which the jaws are opened and closed by a scroll, so called.

The objects of the invention are to reduce the labor necessary to effecting the opening and closing of the jaws and to simplify and strengthen the construction.

Broadly speaking, the invention comprises a construction in which the retardation of an element which normally rotates with the chuck so changes the status of the scroll and the jaws so as to effect a movement of the jaws in toward or out from the chuck center.

In the embodiments of the invention which I have illustrated and shall hereinafter describe, the chuck has a body having guideways for the usual jaws, and a scroll engaging teeth thereon, so that a rotative movement of one relatively to the other causes the jaws to be moved radially in one direction or the other, in combination with an annular member normally movable with the body, and gearing between the said member and the scroll so constructed and arranged that, when the annular member is held against rotation or its rotative movement is retarded, the scroll and the chuck body have said relative rotative movement.

It is evident that the invention is capable of a variety of embodiments which will suggest themselves to persons skilled in the art after becoming acquainted with the constructions herein disclosed, and hence, while I shall hereinafter describe certain details of construction, I do not limit myself thereto so far as the invention in its broader aspects is concerned.

On the accompanying drawings,—Figure 1 illustrates in front elevation a simple construction embodying the invention. Fig. 2 represents a section therethrough. Fig. 3 represents a section on the line 3—3 of Fig. 2. Fig. 4 illustrates one of the gears intermeshing with the jaw-actuating scroll. Fig. 5 is a section illustrating the means for locking one of the intermediate gears and its supporting shaft or bearing in place. Fig. 6 illustrates in front elevation another form of chuck embodying the invention. Fig. 7 represents a plan view of the same partially in section. Fig. 8 represents a radial section through the chuck, only one half of the chuck being shown. Fig. 9 is a vertical transverse section on a plane parallel to the face of the chuck.

Referring to said drawings, and particularly to Figs. 1 to 5 inclusive, the body of the chuck is indicated at 10 and it is provided with the usual radially movable jaws 11 arranged to slide in radial grooves in the face of the body. The body has the internally threaded hub 12 which may be screwed upon the end of a lathe spindle 13 supported in a head 14. The rear face of the body has an annular groove in which is rotatably mounted a scroll 15, the spiral teeth of which engage rack teeth formed on the rear portions of the jaws 11, so that a rotative movement of the scroll in one direction or the other relatively to the body, or a rotation of the body relatively to the scroll, effects a radial movement of the jaws to open or close them as the case may be. Loosely journaled upon the hub 12 and held against the rim of the body by a collar 16 secured to the hub by a screw pin 17, there is a rotatable annulus 18, the rear face of which is grooved to form a rim or flange 19. This annulus 18 is likewise provided with spiral teeth 20 and it constitutes a scroll for a purpose to be explained. Against the rim of the chuck body, there is an annular supporting member or gear-carrier 21 which is secured to the body near its periphery by screws 22 so that it is locked to the body to rotate therewith. This member is provided with a series of inclined sockets 23 in which are inserted short stud shafts or pivots 24 and which are clamped in place by laterally movable pins 25 25 and an adjustable wedge 26 as shown in Fig. 5. Loosely journaled upon each stud shaft or pivot there is a spiral gear 27 arranged in a chamber 28 in the supporting member 21. The axes of the stud shafts are tangent to a circle inscribed about the axis of the chuck body, in such way that, since their teeth are cut at 45°, they constitute worm wheels which are rotatable either by the rotation of the member 19 to the member 21 or the rotation of the member 21 relatively to the member 19. The scroll 15 has substantially radial rack teeth 151 on its rear face and the angle of the axes of the tangent gears and the angle at which the teeth thereon are cut cause the tangent gears to engage the rack teeth 151 in such manner that the rotation of the gears upon their respective axes effects a rotative movement of the scroll 15. It would be possible to form the confronting faces of the two scrolls 18 and 15 with rack teeth and employ ordinary pinions between them, but this would cause an exceedingly rapid movement of the main scroll 15 in the operation of the jaws; whereas, by arranging the gears on a tangent so that they engage substantially radial rack teeth on the main scroll and spiral teeth on the scroll 18, a relative rotation of the scroll 18 through a long arc effects a relatively slight movement of the main scroll 15.

It will be quite apparent from the description already given of the chuck, that, when the body is at rest, the supplemental gear-operating scroll may be rotated by hand to effect a rotation of the gears with a consequent rotation of the scroll 15 relatively to the chuck body and the opening or closing of the jaws, according to the direction in which the gear-operating scroll 18 is turned; but, in order that the jaws may be moved by power instead of manually, I provide means by which, when the chuck body is rotating by power transmitted thereto from the spindle, the gear-operating scroll 18 may be braked, that is, retarded or held against rotation, so that the rotative movement of the body relatively to the scroll 18 will cause the opening or closing of the jaws. Any suitable form of brake may be utilized to retard or stop the rotation of the gear-operating scroll. I have shown a suitable form of brake which consists of a clamp having jaws for engaging the rim or flange 19. The clamp comprises the two coöperating jaws 29 and 30 which are pivoted upon a pivot pin 31 in a bracket 32 affixed to the head of the lathe or other machine in which the chuck is mounted. The two jaws extend laterally from levers 33, 34 so as to embrace the flanged rim 19, and the levers are formed with handles which may be forced together by a closure of the hand of the operator. At any time when the chuck is being power-driven, the operator may close the clamp to brake the rotation of the gear-operating scroll 18 to open or close the chuck jaws.

I have illustrated a plurality of intermediate gears 27 to divide the burden and distribute the power to all sides of the center of the two scrolls, but it is quite apparent that only one such gear may be utilized if desired.

Instead of utilizing a single gear to transmit power directly from one scroll to the other, I may interpose two gears, one driven by the retardable scroll and the other intermeshing with the jaw-operating scroll, as shown in Figs. 6 to 9 inclusive. In this construction, the chuck body 40, having the jaws 41, has an annular recess in its rear face to receive the jaw-operating scroll 42. Journaled upon the hub of the body is a gear-support or carrier 43, the rim of which is secured against rotation in the recess in the rear of the body by screws 44. The gear-operating scroll is indicated at 45 and is journaled on the hub of the gear carrier, being held against axial movement by a collar 46. For convenience, the gear-operating scroll is made in two parts, one for carrying the teeth and the other part 47 having the flanged rim which may be engaged by a brake or clamp similar to that described in connection with Figs. 1 to 5 inclusive. Journaled in the gear carrier 46 are the tangentially arranged shafts 48, each of which carries two gears 49 and 50 rigidly secured thereon. The gears 50 are substantially worm gears and intermesh with the spiral or worm teeth on the scroll 45. The gears 49 are spiral gears and intermesh with complemental rack teeth on the scroll 42 as shown in Fig. 8. The operation of a chuck constructed in this way is substantially like that previously described, for, when the gear-operating scroll is retarded or held against rotation while the body of the chuck continues to rotate, there will be a relative rotation of the jaw-operating scroll and the chuck body to effect the opening or closing movement of the jaws. In both cases, under normal circumstances, the chuck body, two scrolls and the intermediate gearing will rotate as a unit without relative movement, the relative rotative movements of the parts occurring, while the chuck body is rotating, only when the retardable member or gear-operating scroll is retarded, or while the chuck body is at rest when said member is rotated relatively thereto. By changing the direction of the teeth of the gear-operating scroll, the jaw-operating scroll may be retarded or accelerated, when the gear-operating scroll is retarded, to open or close the jaws, as the case may be, by thus effecting a relative rotative movement of the jaw-operating scroll and the body. It is supposed, of course, that the direction of rotation of the chuck spindle may be changed at will by any of the well known forms of gearing.

Having thus explained the nature of my said invention and described a way of making and using the same, although without attempting to set forth all of the forms in which it may be made or all of the modes of its use, what I claim is:

1. A chuck comprising a rotatable body, radially movable jaws, a jaw-operating scroll, a second scroll, and intermediate power-transmitting connections between said scrolls.

2. A chuck comprising a rotatable body, radially movable jaws, a jaw-operating scroll, a second scroll, and an intermediate gear between said scrolls and engaging teeth on said scrolls.

3. A chuck comprising a rotatable body, radially movable jaws, a jaw-operating scroll, a second scroll, and intermediate power-transmitting connections between said scrolls, in combination with means for stopping or retarding the rotation of said gear-operating scroll.

4. A chuck comprising a rotatable body, radially movable jaws, a jaw-operating scroll, a second scroll, and an intermediate gear between said scrolls and engaging teeth on said scrolls, in combination with means for stopping or retarding the rotation of said jaw-operating scroll.

5. A chuck comprising a rotatable body, radially movable jaws, a jaw-operating scroll having rack teeth, a second scroll having spiral teeth and an intermediate spiral gear intermeshed with the said teeth on said scrolls.

6. A chuck comprising a rotatable body, radially movable jaws, a jaw-operating scroll having rack teeth, a second scroll having spiral teeth, and an intermediate spiral gear intermeshed with the said teeth on said scrolls, in combination with means for retarding the rotation of said second-mentioned scroll.

7. A chuck comprising a rotatable body having an annular recess in its rear face, radially movable jaws, a jaw-operating scroll located in said recess and having its rear face toothed, a back-plate secured to the body, a second scroll in the rear of the back-plate and having a marginal flange, gearing carried by the back-plate and intermeshing with both said scrolls, and a brake having jaws for clamping said marginal flange.

8. A chuck comprising a rotatable body having radial grooves in its face, a back-plate rigidly secured to said body, and a scroll in the rear of the back-plate and rotatable on the hub, said body, back-plate and scroll having the same external diameters, jaws located in the grooves in the body, a jaw-operating scroll between the back-plate and the body, and intermediate power-transmitting mechanism mounted on the back-plate and in intermeshed relation with both said scrolls.

In testimony whereof I have affixed my signature, in presence of two witnesses.

JAMES HARTNESS.

Witnesses:
   J. W. BENNETT,
   J. W. WALKER.